US010857706B2

(12) United States Patent
Lim et al.

(10) Patent No.: US 10,857,706 B2
(45) Date of Patent: Dec. 8, 2020

(54) ASSEMBLY TYPE TERMINAL FOR FUEL PUMP AND METHOD FOR MANUFACTURING FUEL PUMP FLANGE USING THE SAME

(71) Applicant: COAVIS, Sejong-si (KR)

(72) Inventors: Chaehoon Lim, Jeollabuk-do (KR); Kusung Kwon, Daejeon (KR); Heejin Yoon, Sejong-si (KR); Dongheon Mo, Sejong-si (KR)

(73) Assignee: COAVIS, Sejong-si (KR)

( * ) Notice: Subject to any disclaimer, the term of this patent is extended or adjusted under 35 U.S.C. 154(b) by 68 days.

(21) Appl. No.: 15/994,214

(22) Filed: May 31, 2018

(65) Prior Publication Data

US 2018/0345551 A1  Dec. 6, 2018

(30) Foreign Application Priority Data

May 31, 2017 (KR) .......................... 10-2017-0067539

(51) Int. Cl.
  *B29C 45/14* (2006.01)
  *F02M 37/00* (2006.01)
  *B29L 31/00* (2006.01)

(52) U.S. Cl.
  CPC .. *B29C 45/14336* (2013.01); *B29C 45/14065* (2013.01); *B29C 45/14311* (2013.01); *B29C 45/14467* (2013.01); *F02M 37/0011* (2013.01); *B29C 2045/14868* (2013.01); *B29L 2031/7496* (2013.01)

(58) Field of Classification Search
  CPC .................................................... H01R 13/514
  See application file for complete search history.

(56) References Cited

U.S. PATENT DOCUMENTS

| 4,580,861 A | * | 4/1986 | Kaley | .................. | H01R 13/514 |
| | | | | | 439/594 |
| 5,967,841 A | * | 10/1999 | Bianca | ................ | B29C 45/0003 |
| | | | | | 439/590 |
| 2002/0192988 A1 | * | 12/2002 | Droesbeke | ......... | H01R 13/6589 |
| | | | | | 439/79 |

FOREIGN PATENT DOCUMENTS

KR  101149806 B1  6/2012

* cited by examiner

*Primary Examiner* — Ross N Gushi
(74) *Attorney, Agent, or Firm* — Norton Rose Fulbright US LLP; James R. Crawford

(57) ABSTRACT

Provided are an assembly type terminal for a fuel pump capable of decreasing a process additionally required at the time of injection-molding a flange using a separation type terminal according to the related art and preventing a defect of a product that may occur at the time of injection-molding the flange, and a method of manufacturing a fuel pump flange using the same. The assembly type terminal for a fuel pump includes: a plurality of power supply terminals; a plurality of coupling bodies 100 and 200 coupling one or more power supply terminals to each other; and a coupling member 300 formed in the coupling bodies and coupling the plurality of coupling bodies 100 and 200 to each other, wherein the plurality of coupling bodies are spaced apart from each other and are coupled to each other by the coupling member.

5 Claims, 11 Drawing Sheets

ASSEMBLY TYPE TERMINAL FOR FUEL PUMP AND METHOD FOR MANUFACTURING FUEL PUMP FLANGE USING THE SAME

CROSS-REFERENCE TO RELATED APPLICATIONS

This application claims priority under 35 U.S.C. § 119 to Korean Patent Application No. 10-2017-0067539, filed on May 31, 2017, in the Korean Intellectual Property Office, the disclosure of which is incorporated herein by reference in its entirety.

TECHNICAL FIELD

The following disclosure relates to an assembly type terminal for a fuel pump and a method of manufacturing a fuel pump flange using the same. More particularly, the following disclosure relates to an assembly type terminal for a fuel pump capable of decreasing a process additionally required at the time of injection-molding a flange using a separation type terminal according to the related art and preventing a defect of a product that may occur at the time of injection-molding the flange, and a method of manufacturing a fuel pump flange using the same.

BACKGROUND

A fuel tank in which the fuel is stored is installed in an apparatus of a vehicle, or the like, driven by being supplied with a liquid fuel, such as a gasoline engine or a diesel engine, and a fuel pump module is installed in the fuel tank and forcibly supplies the fuel stored in the fuel tank to the engine.

A fuel pump module according to the related art is disclosed in Korean Patent No. 10-1149806 (entitled "Flange for Fuel Pump Module and Manufacturing Method Thereof", published on Jun. 8, 2012, and hereinafter referred to as Related Art 1). FIG. 1 illustrates a fuel pump module according to Related Art 1. As illustrated in FIG. 1, the fuel pump module mainly includes a flange assembly 1 fixed to a fuel tank and a reservoir body assembly 2 connected to a lower side of the flange assembly 1 by guide rods 3 and including a fuel filter and a fuel pump.

The flange assembly 1 is configured to include a supply port 11 for transferring a fuel, a flange 10 provided with a valve seating portion 12 in which a valve is seated, a valve (not illustrated) provided in the valve seating portion 12 of the flange 10, and power supply terminals 13 injection-molded integrally with the flange 10.

The power supply terminal 13, which is a component electrically connecting the fuel pump and a power supply of a vehicle to each other and supplying power to the fuel pump, is formed of a material having excellent conductivity and is formed integrally with the flange through insert-molding or over-molding at the time of injection-molding a form of the flange. FIG. 2 illustrates only the power supply terminals 13 in more detail. As illustrated in FIG. 2, a plurality of power supply terminals 13 are recently formed integrally with the flange in accordance with increases in output and efficiency of the apparatus. In the case in which the number of power supply terminals 13 is plural, the power supply terminals 13 may be arranged two-dimensionally (for example, in two rows) rather than in a row in order to be installed in a limited area.

In the case in which the power supply terminals 13 are arranged in the two rows, a method of fixing the plurality of power supply terminals disposed in each row by one unit using separate synthetic resins, fixing two units to a mold, and then injection-molding the flange is used. In order to fix two units to the mold, a process of seating each of the units in the mold and then fixing each of the units to the mold is required. However, in this process, an additional process and equipment are required, the mold should be structurally deformed, and a case in which the units are pushed due to an injection-molded product introduced between the two units occurs, such that a defective rate is increased.

RELATED ART DOCUMENT

Patent Document (Patent Document 0001) Korean Patent No. 10-1149806 (entitled "Flange for Fuel Pump Module and Manufacturing Method Thereof" and published on Jun. 8, 2012)

SUMMARY

An embodiment of the present invention is directed to providing an assembly type terminal for a fuel pump capable of improving productivity by decreasing a process time through improvement of a manufacturing method according to the related art and capable of decreasing a defective rate by preventing units from being pushed by an injection-molded product introduced between the units at the time of injection-molding a flange, and a method of manufacturing a fuel pump flange using the same.

In one general aspect, an assembly type terminal for a fuel pump includes: a plurality of power supply terminals; a plurality of coupling bodies 100 and 200 coupling one or more power supply terminals to each other; and a coupling member 300 formed in the coupling bodies 100 and 200 and coupling the plurality of coupling bodies 100 and 200 to each other, wherein the plurality of coupling bodies are spaced apart from each other and are coupled to each other by the coupling member.

The coupling member 300 may include: an insertion hole 310 formed in one of the coupling bodies so as to penetrate through the coupling body; and an insertion portion 320 formed in the other of the coupling bodies and inserted into the insertion hole 310.

The coupling member 300 may further include an interval maintaining portion 330 formed between the insertion portion 320 and the coupling body and formed to have a cross section greater than that of the insertion hole 310.

The coupling member 300 may include: a sliding portion 340 formed on one of the coupling bodies to protrude toward one side; and a sliding groove 350 formed in the other of the coupling bodies to be depressed so as to correspond to a shape of the sliding portion 340.

The coupling member 300 may further include a coupling auxiliary portion 360 formed to protrude on the sliding portion 340 and protrude in a direction different from a direction in which the sliding portion 340 protrudes.

A protruding length of the sliding portion 340 may be longer than a depressed depth of the sliding groove 350.

The assembly type terminal for a fuel pump may further include depressed portions 400 depressed in outer surfaces of the coupling bodies 100 and 200.

In another general aspect, a method of manufacturing a fuel pump flange using the assembly type terminal for a fuel pump includes: a coupling member coupling step of coupling the coupling members formed in each of the plurality of coupling bodies to each other to assemble the plurality of coupling bodies as a single coupling body; and a flange injection-molding step of fixing the single coupling body assembled in the coupling member coupling step into a mold and injection-molding the flange.

DETAILED DESCRIPTION OF MAIN ELEMENTS

Figure 1:
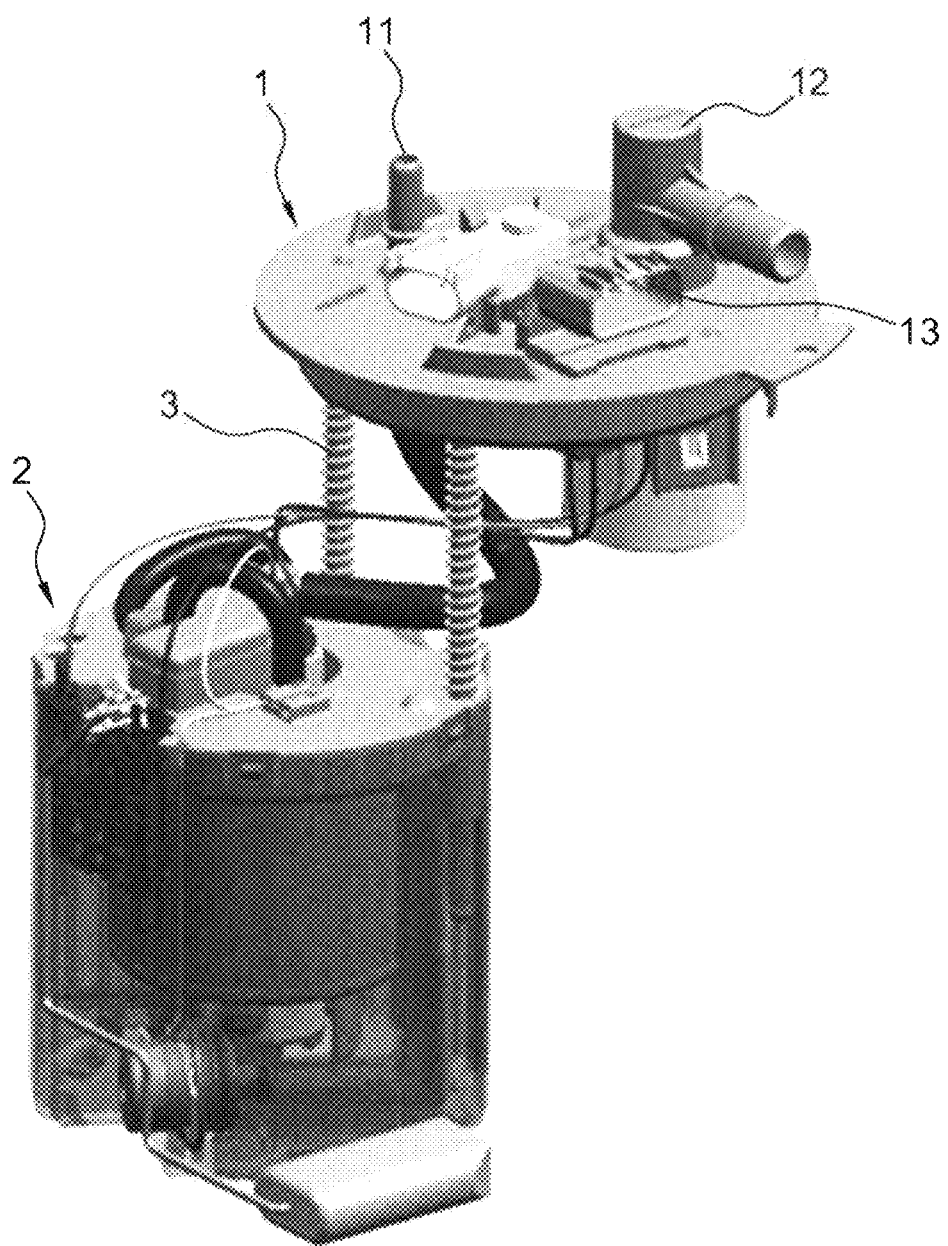
FIG. 1 is a schematic view of a fuel pump module.
Figure 2:
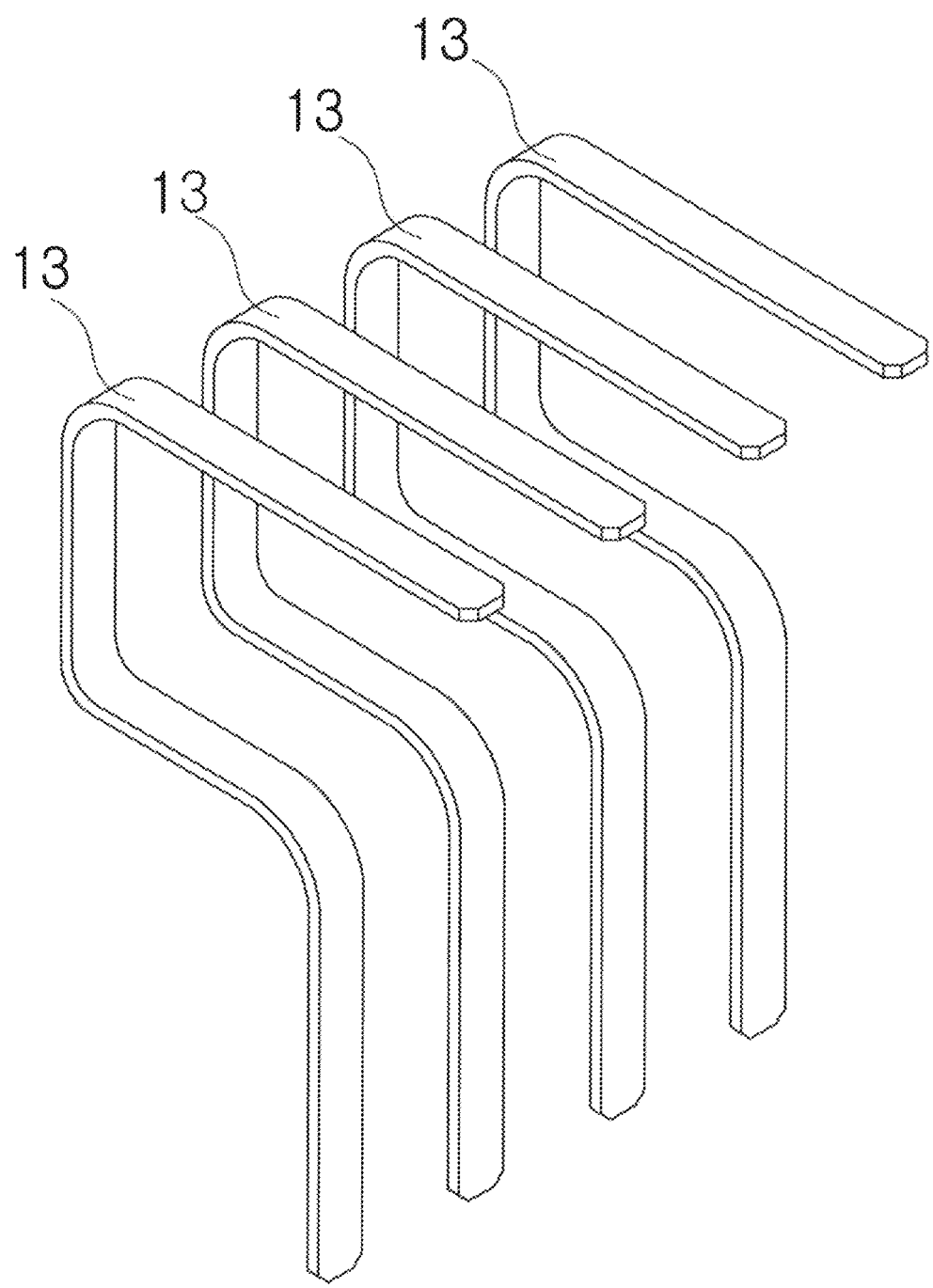
FIG. 2 is a perspective view of a power supply terminal.

1: flange assembly
2: reservoir body assembly
3: guide rod
10: flange
11: supply port
12: valve seating portion
13: power supply terminal
A, A1, A2, A3, A4: power supply terminal
100, 200: coupling body
300: coupling member
310: insertion hole
320: insertion portion
330: interval maintaining portion
340: sliding portion
350: sliding groove
360: coupling auxiliary portion
400: depressed portion
S1: first section
S2: second section
S3: third section

DETAILED DESCRIPTION OF EMBODIMENTS

Hereinafter, an assembly type terminal for a fuel pump and a method of manufacturing a fuel pump flange using the same according to the present invention will be described in detail with reference to the accompanying drawings. Exemplary embodiments of an assembly type terminal for a fuel pump will be first described, and a method of manufacturing a fuel pump flange using an assembly type terminal for a fuel pump will be described.

The present invention may be divided into a first exemplary embodiment and a second exemplary embodiment depending on an exemplary embodiment of a coupling member to be described below. Hereinafter, a first exemplary embodiment and a second exemplary embodiment will be separately described.

First Exemplary Embodiment

Figure 3:
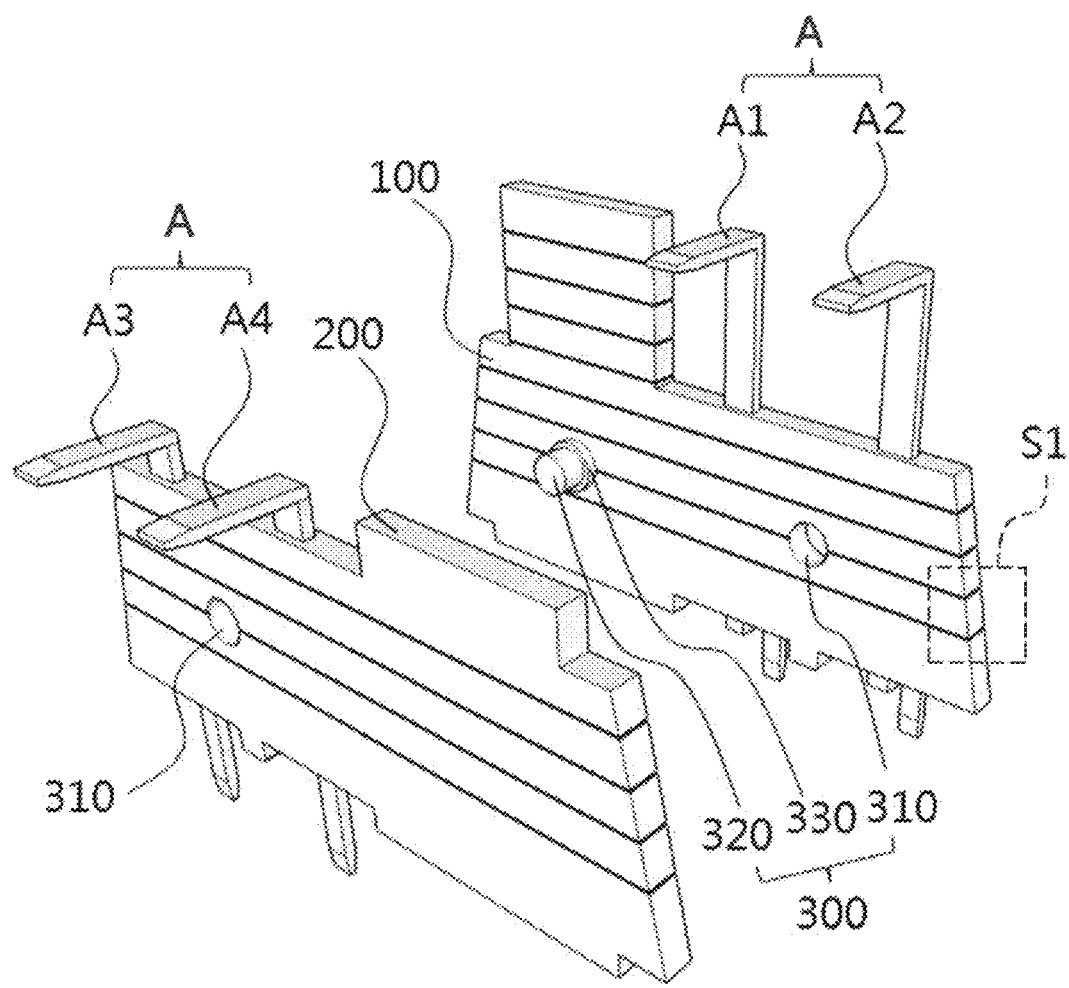
FIG. 3 is an exploded perspective view of an assembly type terminal for a fuel pump according to a first exemplary embodiment of the present invention.
Figure 4:
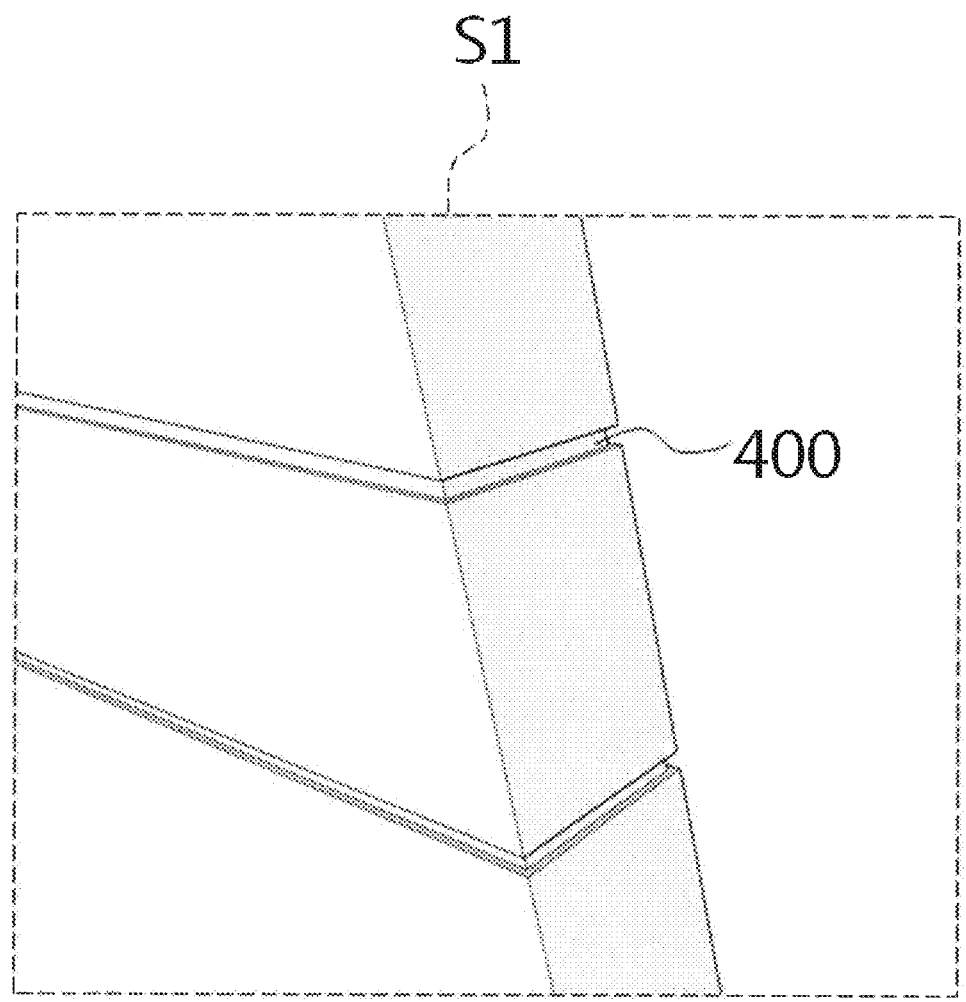
FIG. 4 is a partially enlarged view of FIG. 3.
Figure 5:
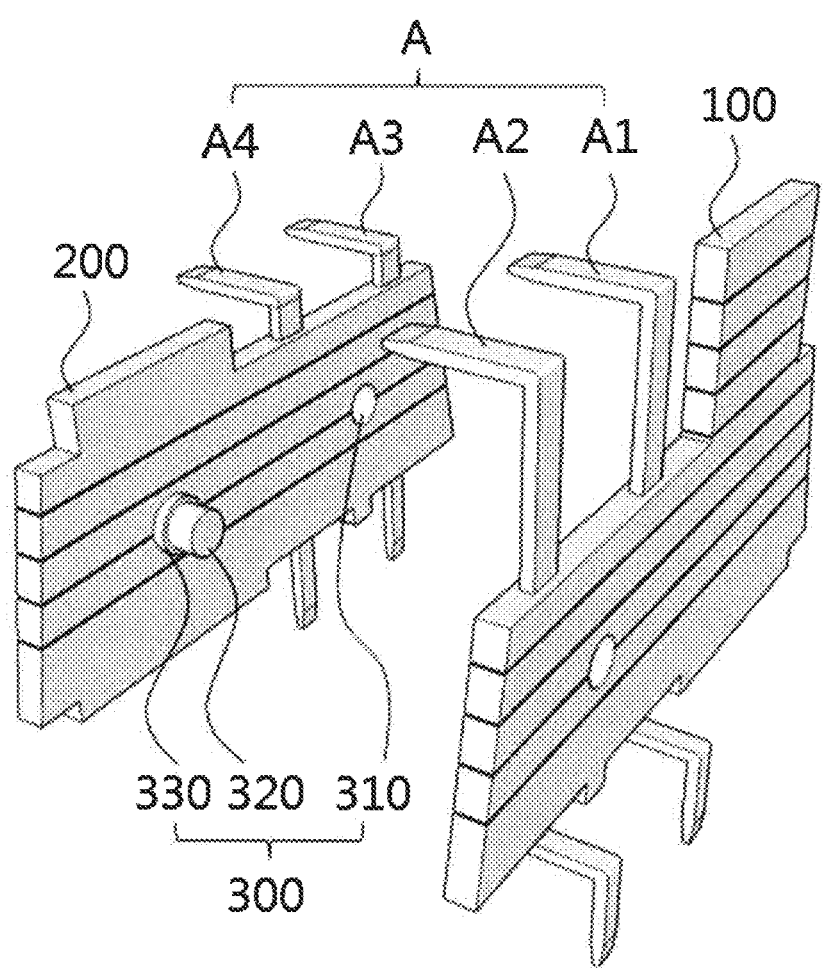
FIG. 5 is another exploded perspective view of the assembly type terminal for a fuel pump according to a first exemplary embodiment of the present invention.
Figure 6:
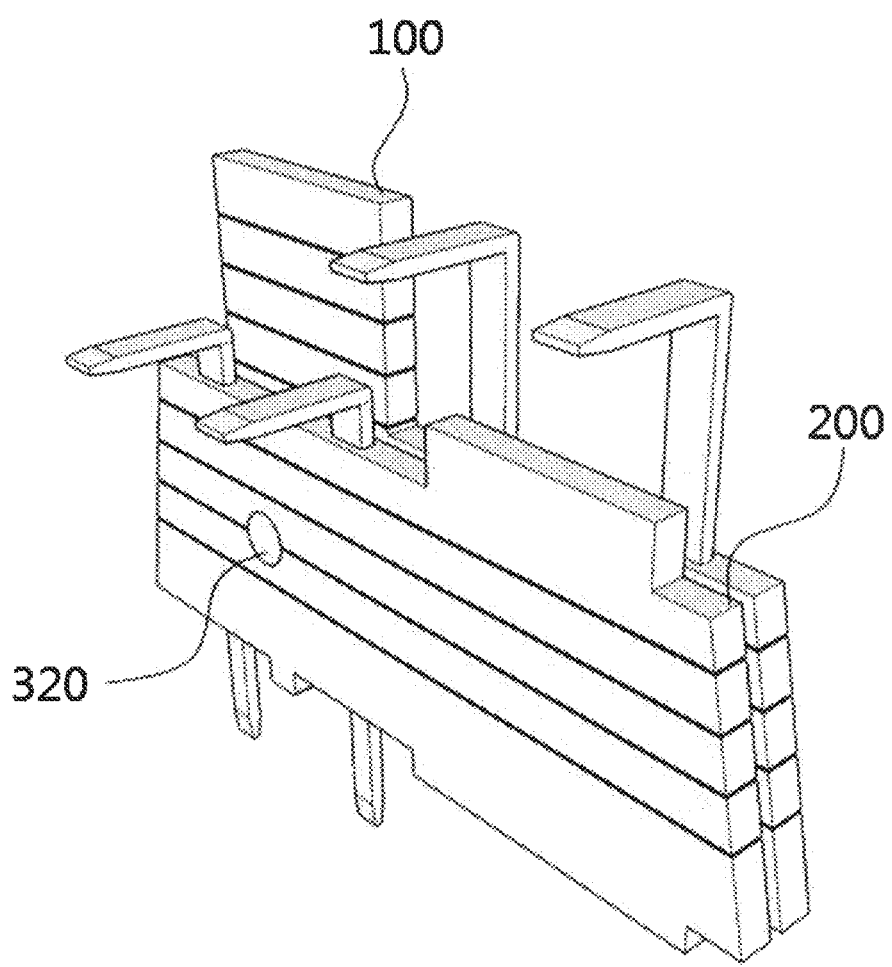
FIG. 6 is an assembled perspective view of the assembly type terminal for a fuel pump according to a first exemplary embodiment of the present invention.
Figure 7:
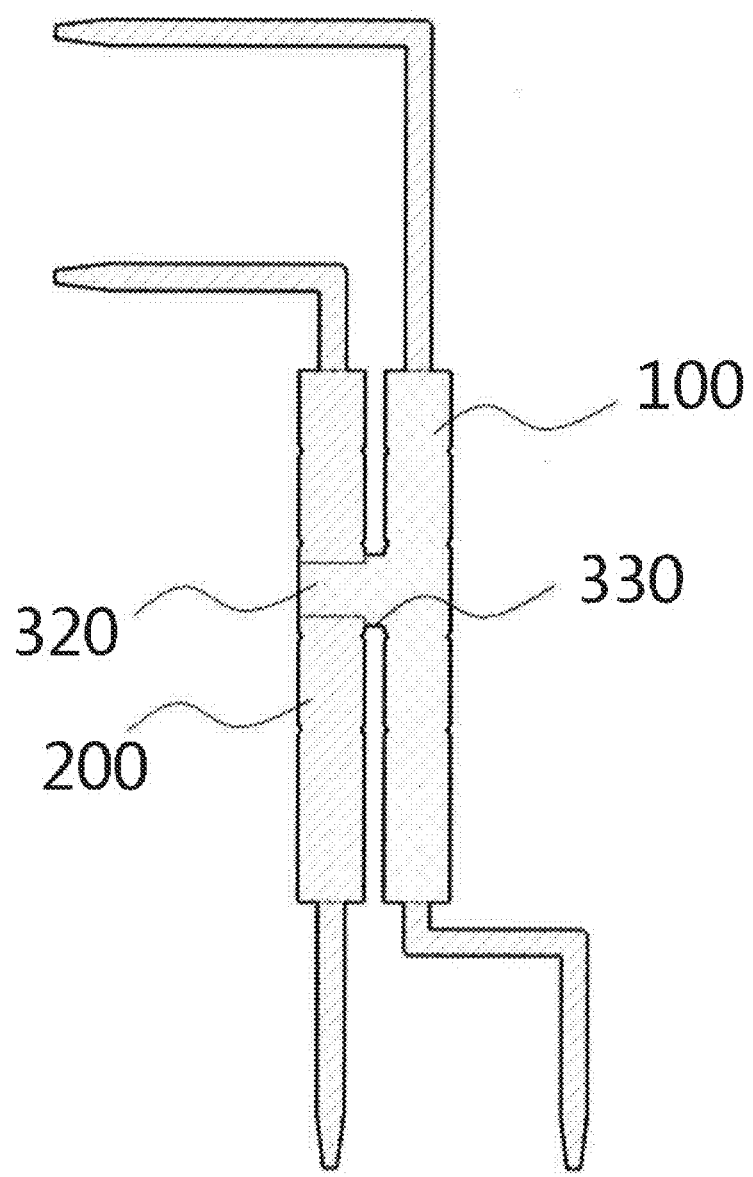
FIG. 7 is an assembled schematic view of the assembly type terminal for a fuel pump according to a first exemplary embodiment of the present invention.

FIGS. 3 to 7 illustrate an assembly type terminal for a fuel pump according to a first exemplary embodiment of the present invention. In more detail, FIGS. 3 and 5 are exploded views of the assembly type terminal for a fuel pump according to a first embodiment of the present invention, FIG. 4 is an enlarged view of a first section S1 of FIG. 3, FIG. 6 is an assembled view of the assembly type terminal for a fuel pump according to a first exemplary embodiment of the present invention, FIG. 7 is a schematic assembled cross-sectional view of the assembly type terminal for a fuel pump according to a first exemplary embodiment of the present invention.

As illustrated in FIGS. 3 to 5, the assembly type terminal for a fuel pump according to the present invention may include power supply terminals A, coupling bodies 100 and 200, and a coupling member 300.

The power supply terminal A may be formed of a conductor such as a metal and may be a path through which a current is supplied from a power supply to a fuel pump. The power supply terminal A may have a bar form in which it is extended toward one side and have a form in which it is bent once or twice, but is not limited thereto.

A single coupling body 100 couples one or more power supply terminals to each other, and couples a plurality of power supply terminals A1 and A2 to each other in the case in which the number of power supply terminals is plural, as illustrated in FIGS. 3 and 5. Two coupling bodies 100 and 200 are formed and the other coupling body 200 couples two power supply terminals A3 and A4 to each other, but the present invention is not limited thereto. That is, a single coupling body may couple two or more power supply terminals to each other or may be formed in only a single power supply terminal.

Both distal ends of the power supply terminals A are connected to the power supply and the fuel pump, respectively, the coupling bodies 100 and 200 surround intermediate ends of the power supply terminals A to expose both distal ends of the power supply terminals A to upper and lower sides of the coupling bodies 100 and 200. The coupling bodies expose both distal ends of the power supply terminals A in order to electrically connect both distal ends of the power supply terminal A to the power supply and the fuel pump.

The reason why the two coupling bodies 100 and 200 are formed in FIGS. 3 and 5 is that four power supply terminals A are disposed in two rows, and in the case in which the power supply terminals are disposed in three or more rows due to an increase in the number of power supply terminals, the number of coupling bodies may be increased.

The coupling member 300 may couple different coupling bodies to each other, and as illustrated in FIGS. 3, 5, and 7, in a first exemplary embodiment of the present invention, the coupling member 300 may include an insertion hole 310, an insertion portion 320, and an interval maintaining portion 330.

As illustrated in FIG. 3, the insertion hole 310 may be formed in the coupling body so as to penetrate through the coupling body. The insertion hole 310 may be formed in only a single coupling body, but as illustrated in FIGS. 3 and 5, in a first exemplary embodiment of the present invention, insertion holes 310 may be formed in the coupling bodies 100 and 200, respectively, and may be formed at different positions so as not to overlap each other when the coupling bodies are coupled to each other.

The insertion portion 320 may be formed to protrude on a position corresponding to the insertion hole 310 in order to be inserted into the insertion hole 310 when the coupling bodies 100 and 200 are coupled to each other.

A state in which the insertion portion 320 is inserted into the insertion hole 310 is illustrated in FIG. 6, and when the two coupling bodies 100 and 200 are coupled to each other by inserting the insertion portion 320 into the insertion hole as illustrated in FIG. 7, a predetermined space is formed between the two coupling bodies 100 and 200. This is to more firmly couple the coupling bodies and a flange to each other by allowing an injection-molded product between the two coupling bodies at the time of injection-molding the flange.

In the case in which a length and a cross-sectional area of the insertion portion 320 are the same as those of the insertion hole 310, when the two coupling bodies 100 and 200 are coupled to each other, the predetermined interval may not be maintained between the two coupling bodies 100 and 200. The interval maintaining portion 330, which is to maintain an interval between the coupling bodies, may be formed between the insertion hole 310 and the coupling body, and may be formed to have a cross section greater than that of the insertion hole 310.

In a first exemplary embodiment of the present invention, the interval between different coupling bodies at the time of coupling the different coupling bodies to each other is maintained using the interval maintaining portion 330, but the present invention is not limited thereto. That is, another shape is also possible as long as it may maintain the interval between the coupling bodies.

After the two coupling bodies 100 and 200 are coupled to each other by inserting the insertion portion 320 into the insertion hole 310, a state in which the two coupling bodies 100 and 200 are coupled to each other needs to be maintained in order to prevent the coupling bodies from being pushed at the time of injection-molding the flange. Therefore, in a first exemplary embodiment of the present invention, the insertion portion 320 may be formed to be longer than the insertion hole 310, such that when the two coupling bodies 100 and 200 are coupled to each other, one side of the insertion portion 320 protrudes, and the coupling member 300 may include a cap (not illustrated) fitted or screwed onto one side of the insertion portion 320 that protrudes, thereby more firmly coupling the coupling bodies 100 and 200 to each other. However, the cap is only an example, and the coupling member is not limited to including the cap, but may include various forms as long as the insertion hole 310 and the insertion portion 320 may be firmly coupled to each other.

As illustrated in FIGS. 3 and 4, the assembly type terminal for a fuel pump according to a first exemplary embodiment of the present invention may further include depressed portions 400 formed in outer surfaces of the coupling bodies 100 and 200. The depressed portions 400 may be depressed in the outer surfaces of the coupling bodies 100 and 200, be formed along circumferences of the coupling bodies, and be formed in the plural. The injection-molded product is introduced into spaces of the depressed portions 400 at the time of injection-molding the flange, such that the depressed portions 400 may improve bondability between the terminal and the flange. In addition, in the fuel pump, a case in which oil vapor (gas) generated from a fuel accommodated in the fuel pump is leaked to a space between the terminal and the flange may occur. However, in a first exemplary embodiment of the present invention, the depressed portions 400 are formed, such that a bonding surface between the terminal and the flange becomes long, thereby making it possible to prevent the oil vapor from being leaked from the inside of the fuel pump to the outside of the fuel pump.

Second Exemplary Embodiment

Hereinafter, a second exemplary embodiment of the present invention will be described in detail with reference to the accompanying drawings. As described above, a first exemplary embodiment and a second exemplary embodiment of the present invention are different in a form of the coupling member 300 from each other, and a modification of the coupling member 300 will thus be described in detail, and a description for contents of a second exemplary embodiment that are the same as those of a first exemplar embodiment will be omitted.

Figure 8:
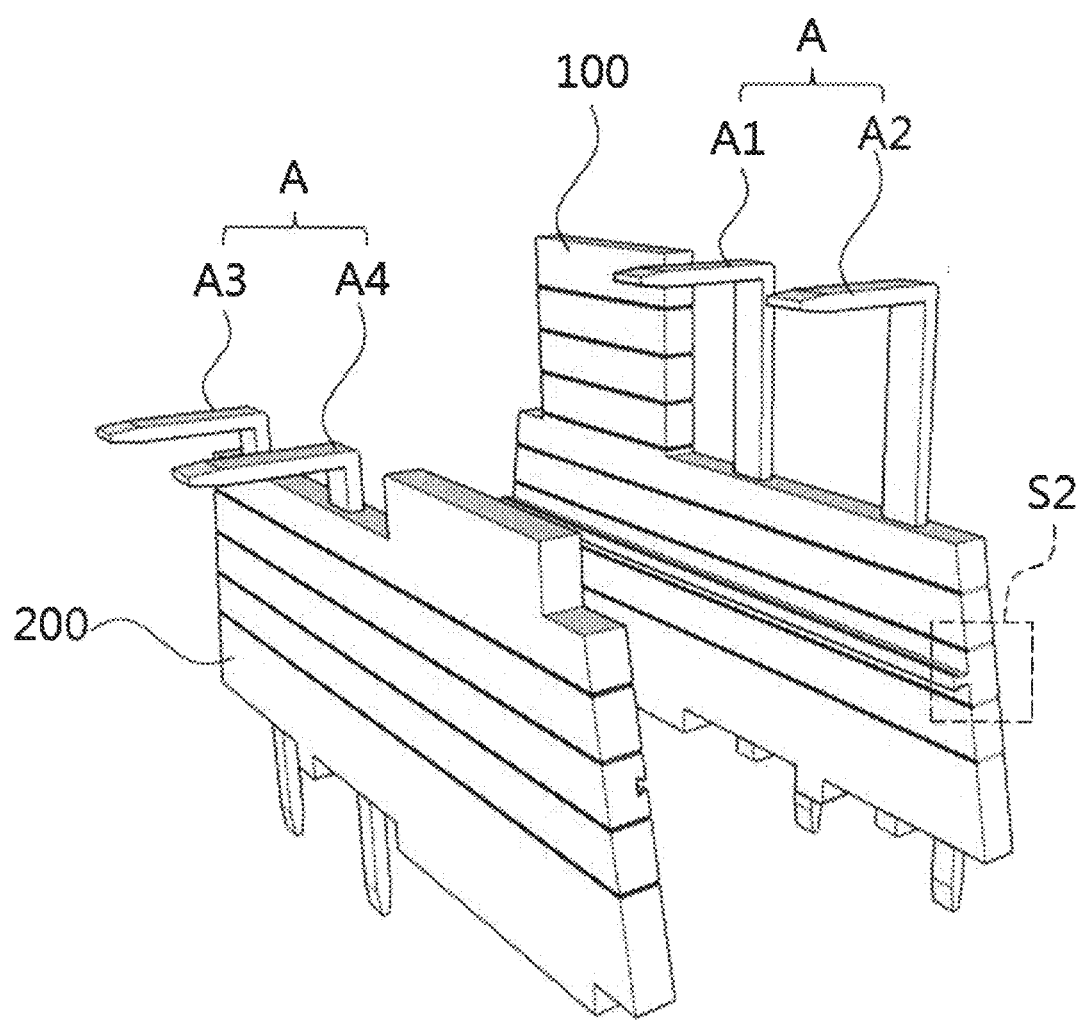
FIG. 8 is an exploded perspective view of an assembly type terminal for a fuel pump according to a second exemplary embodiment of the present invention.
Figure 9:
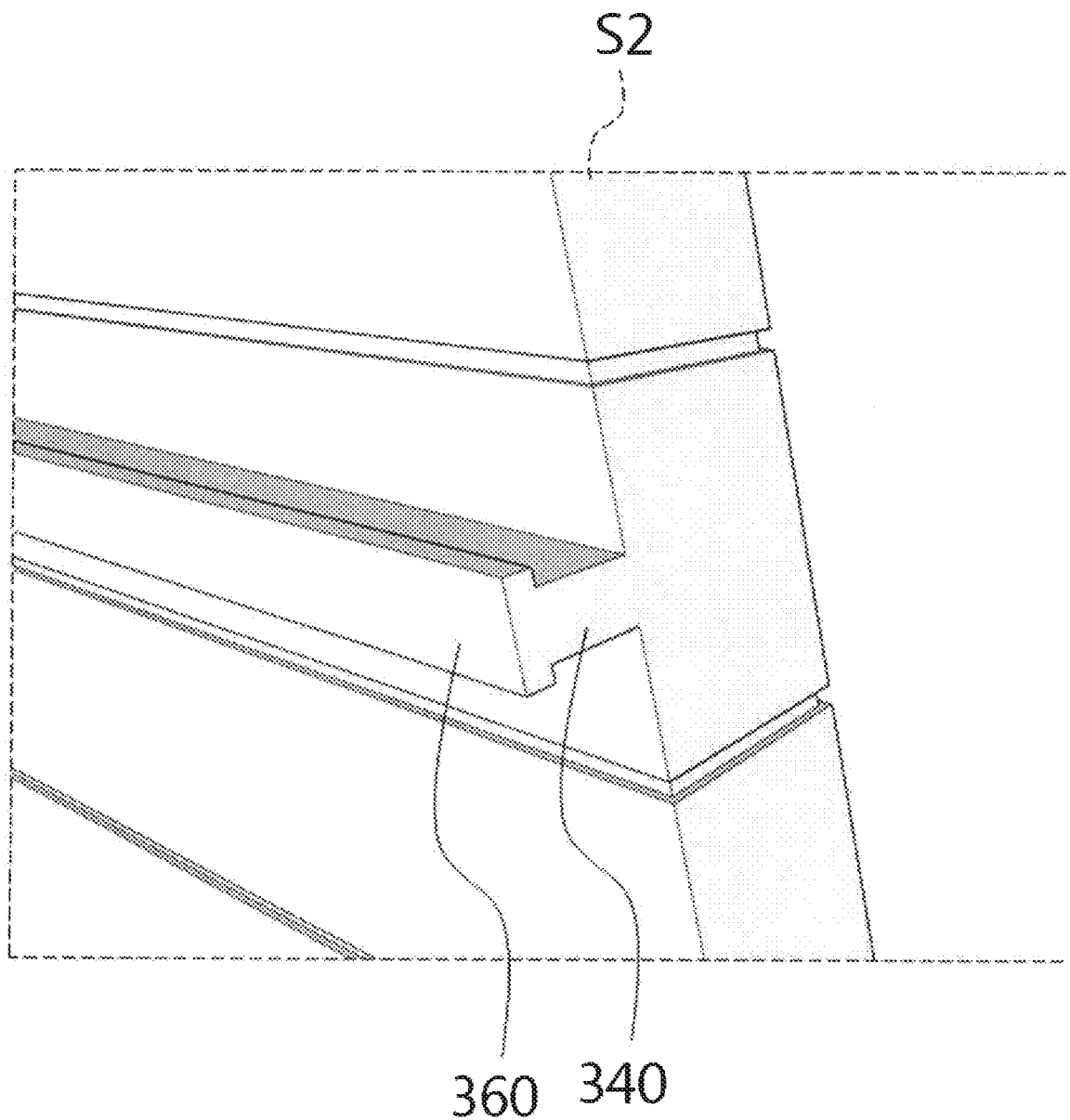
FIG. 9 is a partially enlarged view of FIG. 8.
Figure 10:
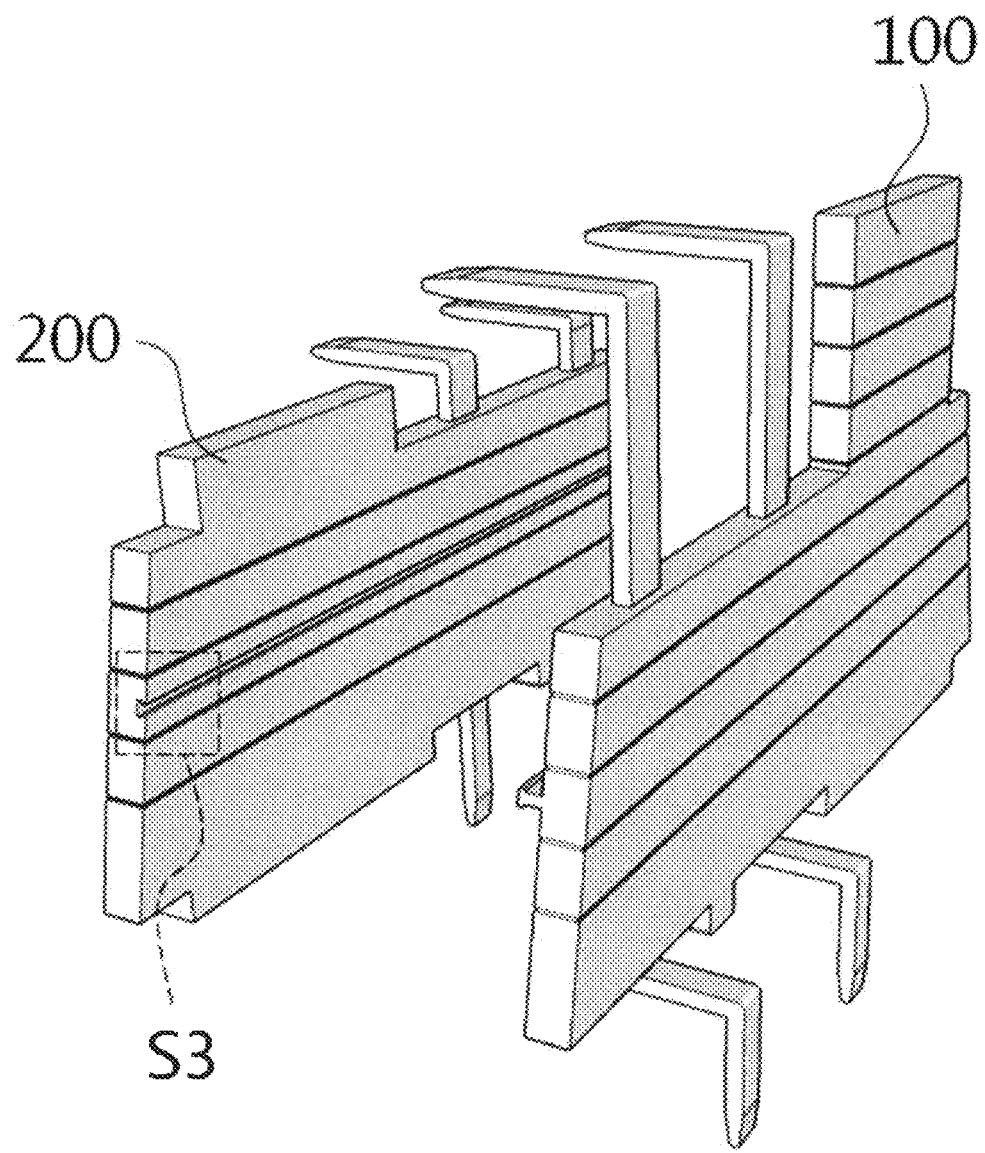
FIG. 10 is another exploded perspective view of the assembly type terminal for a fuel pump according to a second exemplary embodiment of the present invention.
Figure 11:
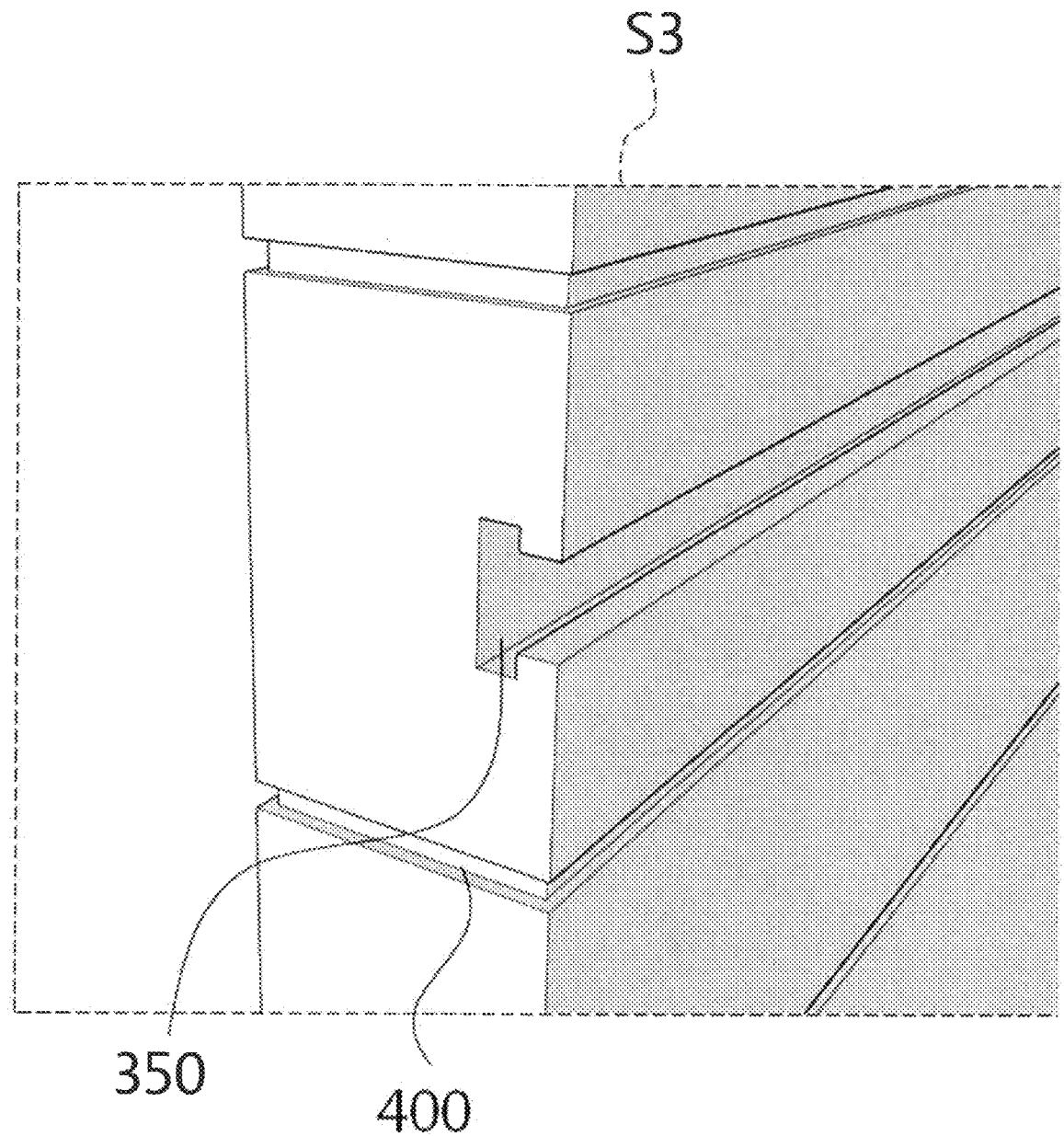
FIG. 11 is a partially enlarged view of FIG. 10.

FIG. 8 is a view illustrating an assembly type terminal for a fuel pump according to a second exemplary embodiment of the present invention, FIG. 9 is an enlarged view of a second section S2 of FIG. 8, FIG. 10 is a view illustrating the assembly type terminal for a fuel pump according to a second exemplary embodiment of the present invention when viewed at another angle, and FIG. 11 is an enlarged view of a third section S3 of FIG. 10.

As illustrated in FIGS. 8 to 11, in a second exemplary embodiment of the present invention, the coupling member 300 may include a sliding portion 340 and a sliding groove 350.

As illustrated in FIGS. 8 to 11, the sliding portion 340 may be formed on the coupling body 100 to protrude, and the sliding groove 350 may be formed in the coupling body 200 to be depressed so that the sliding portion 340 may be inserted and then slid thereinto. The coupling bodies 100 and 200 may be coupled to each other by fitting the sliding portion 340 into the sliding groove 350.

When the sliding portion 340 is formed to protrude at the same area and the sliding groove 350 has a form corresponding to that of the sliding portion 340, the coupling bodies 100 and 200 may not be firmly coupled to each other. Therefore, in a second exemplary embodiment of the present invention, the coupling member 300 may further include a coupling auxiliary portion formed to protrude on the sliding portion 340 and protrude in a direction different from a direction in which the sliding portion 340 protrudes.

FIG. 9 illustrates an example of the coupling auxiliary portion 360. As illustrated in FIG. 9, the coupling auxiliary portion 360 may protrude from a protruding distal end of the sliding portion 340 in two directions perpendicular to a direction in which the sliding portion 340 protrudes, thereby forming a ruggedness shape, and the ruggedness shape formed by the sliding portion 340 and the coupling auxiliary portion 360 may more firmly couple the two coupling bodies 100 and 200 to each other. However, a shape of the coupling auxiliary portion 360 is not limited to the ruggedness shape, but may be various shapes in which it may more firmly couple the coupling bodies 100 and 200 to each other.

Lengths at which the sliding portion 340 and the coupling auxiliary portion 360 are extended may be longer than a depth of the sliding groove 350. This is to maintain an interval between the coupling bodies 100 and 200 when the coupling bodies 100 and 200 are coupled to each other, and plays the same role of that of the interval maintaining portion 330 of a first exemplary embodiment.

Hereinafter, a method of manufacturing a fuel pump flange using an assembly type terminal for a fuel pump will be described in detail.

The method of manufacturing a fuel pump flange using the assembly type terminal for a fuel pump according to the present invention is configured to include a coupling member coupling step and a flange injection-molding step.

The coupling member coupling step is a process of coupling the coupling members 300 formed in each of a plurality of coupling bodies 100 and 200 to each other to assemble the plurality of coupling bodies 100 and 200 as a single coupling body. Since the single coupling body is assembled in the coupling member coupling step, in a flange injection-molding step to be described below, a process of moving the plurality of coupling bodies into a mold may be replaced by a process of moving the single coupling body into the mold In the flange injection-molding step, the coupling body assembled in the coupling member coupling step is fixed into the mold, and the flange is injection-molded. Since the plurality of coupling bodies are coupled to each other to become the single coupling body in the coupling member coupling step as described above, a process of moving the coupling body is required only once, such that a process time is decreased as compared with a conventional manner of moving each of the coupling bodies into the mold.

In addition, the present invention has been made in a process of using a plurality of coupling bodies (for example, 8-pin terminals) depending on a market demand during using a single coupling body (for example, a 4-pin terminal) according to the related art. In order to use a mold used in an injection-molding process using the single coupling body according to the related art in an injection-molding process using a plurality of coupling bodies that are not coupled to each other, a mold needs to be newly manufactured in order to fix the respective coupling bodies into the mold. However, when the plurality of coupling bodies are coupled to each other as the single coupling body using the coupling member as in the present invention, the mold does not need to be separately manufactured, and the existing mold may be used, which is economical.

The injection-molded product injected into the mold in the flange injection-molding step is a plastic-based synthetic resin, and is injected between the surrounding of the coupling bodies coupled to each other and the coupling bodies to form the flange.

According to various exemplary embodiments of the assembly type terminal for a fuel pump and the method of manufacturing a fuel pump flange using the same according to the present invention as described above, the process time is decreased as compared with a conventional manner, such that productivity may be improved, and the coupling bodies are coupled to each other in an assembling manner, such that a probability of a defect occurring since the coupling bodies are pushed due to a pressure of the injection-molded product at the time of injection-molding the flange may be decreased.

The present invention is not limited to the abovementioned exemplary embodiments, and may be variously applied, and may be variously modified without departing from the gist of the present invention claimed in the claims.

What is claimed is:

1. An assembly type terminal for a fuel pump, comprising:
   a plurality of power supply terminals;
   a plurality of coupling bodies coupling one or more power supply terminals to each other; and
   a coupling member formed in the coupling bodies and coupling the plurality of coupling bodies to each other,
   wherein the plurality of coupling bodies are spaced apart from each other and are coupled to each other by the coupling member; and
   wherein the coupling member includes: an insertion hole formed in one of the coupling bodies so as to penetrate through the coupling body; and an insertion portion formed in another one of the coupling bodies and inserted into the insertion hole, and
   an interval maintaining portion formed between the insertion portion and the coupling body to have a cross section greater than that of the insertion hole.

2. The assembly type terminal for a fuel pump of claim 1, further comprising depressed portions depressed in outer surfaces of the coupling bodies.

3. A method of manufacturing a fuel pump flange using the assembly type terminal for a fuel pump of claim 1, comprising:
   a coupling member coupling step of coupling the coupling members formed in each of the plurality of coupling bodies to each other to assemble the plurality of coupling bodies as a single coupling body; and
   a flange injection-molding step of fixing the single coupling body assembled in the coupling member coupling step into a mold and injection-molding the flange.

4. A method of manufacturing a fuel pump flange using the assembly type terminal for a fuel pump of claim 1, comprising:
   a coupling member coupling step of coupling the coupling members formed in each of the plurality of coupling bodies to each other to assemble the plurality of coupling bodies as a single coupling body; and
   a flange injection-molding step of fixing the single coupling body assembled in the coupling member coupling step into a mold and injection-molding the flange.

5. A method of manufacturing a fuel pump flange using the assembly type terminal for a fuel pump of claim 1, comprising:
   a coupling member coupling step of coupling the coupling members formed in each of the plurality of coupling bodies to each other to assemble the plurality of coupling bodies as a single coupling body; and
   a flange injection-molding step of fixing the single coupling body assembled in the coupling member coupling step into a mold and injection-molding the flange.

* * * * *